United States Patent
Rantala et al.

(10) Patent No.: US 10,560,912 B2
(45) Date of Patent: Feb. 11, 2020

(54) WIRELESS DEVICE RANGING

(71) Applicant: Provenance Asset Group LLC, Essex, CT (US)

(72) Inventors: Enrico Rantala, Berkeley, CA (US); Ilari Teikari, Helsinki (FI); Jarkko Kneckt, Espoo (FI); Mika Kasslin, Espoo (FI); Janne Marin, Espoo (FI); Olli Alanen, Vantaa (FI)

(73) Assignee: Provenance Asset Group LLC, Pittsford, NY (US)

( * ) Notice: Subject to any disclaimer, the term of this patent is extended or adjusted under 35 U.S.C. 154(b) by 92 days.

(21) Appl. No.: 15/566,751

(22) PCT Filed: Apr. 17, 2015

(86) PCT No.: PCT/FI2015/050268
§ 371 (c)(1),
(2) Date: Oct. 16, 2017

(87) PCT Pub. No.: WO2016/166405
PCT Pub. Date: Oct. 20, 2016

(65) Prior Publication Data
US 2018/0084515 A1    Mar. 22, 2018

(51) Int. Cl.
*H04W 56/00* (2009.01)
*G01S 5/14* (2006.01)
(Continued)

(52) U.S. Cl.
CPC .......... *H04W 56/0055* (2013.01); *G01S 5/14* (2013.01); *G01S 11/02* (2013.01); *G01S 11/08* (2013.01);
(Continued)

(58) Field of Classification Search
None
See application file for complete search history.

(56) References Cited

U.S. PATENT DOCUMENTS

| 6,449,485 B1 | 9/2002 | Anzil ............................. 455/456 |
| 8,063,825 B1 | 11/2011 | Yang ............................. 342/458 |

(Continued)

FOREIGN PATENT DOCUMENTS

WO    WO 2014/011485 A1    1/2014

OTHER PUBLICATIONS

De Dominicis, et al., "Timestamping performance analysis of IEEE 802.15.4a systems based on SDR platforms", May 13-16, 2012, Instrumentation and Measurement Technology Conference (I2MTC), 2012 IEEE International, Graz, Austria, Abstract, 1 pg.

*Primary Examiner* — Saumit Shah
(74) *Attorney, Agent, or Firm* — Dinsmore & Shohl LLP

(57) ABSTRACT

A method and apparatus for detecting, by a first device, a timing measurement frame from a second device, the timing measurement frame having a plurality of time measurement samples, wherein at least the first of the measurement samples has a transmit timestamp value; determining transmit timing values for the subsequent measurement samples; applying a receive timestamp value to each of the received measurement samples; and determining a relative clock drift between a clock of the first device and a clock of the second device by comparing the receive timestamp values with transmit timing values of one or more measurement samples contained in the frame.

20 Claims, 7 Drawing Sheets

(51) Int. Cl.
*H04L 27/26* (2006.01)
*G01S 13/74* (2006.01)
*G01S 11/02* (2010.01)
*G01S 11/08* (2006.01)

(52) U.S. Cl.
CPC .............. *G01S 13/74* (2013.01); *H04L 27/26* (2013.01); *H04L 27/2662* (2013.01); *H04L 27/2675* (2013.01); *H04L 27/2692* (2013.01); *H04W 56/00* (2013.01)

(56) References Cited

U.S. PATENT DOCUMENTS

| | | | |
|---|---|---|---|
| 8,325,704 B1 * | 12/2012 | Lemkin | H04J 3/0667 370/347 |
| 2005/0058081 A1 | 3/2005 | Elliott | 370/252 |
| 2011/0316747 A1 | 12/2011 | Budianu et al. | 342/387 |
| 2013/0301635 A1 * | 11/2013 | Hollabaugh | H04W 56/0035 370/350 |
| 2016/0127066 A1 * | 5/2016 | Jose | H04W 56/0075 370/350 |

* cited by examiner

| Element ID 501 | Length 502 | Number of measurement symbols 503 | Timestamp mode 504 | Timestamp of measurement sample #1 505 | ... | Timestamp of measurement sample #n |
|---|---|---|---|---|---|---|
| 1 | 1 | 1 | 1 | 10 | ... | 0 or 10 |

Octets:

WIRELESS DEVICE RANGING

FIELD

The invention relates to ranging or positioning of wireless devices.

BACKGROUND

In recent years people have used mobile devices to ascertain their current location. Location determination of a device may be useful in various scenarios. For example, it may be useful to ascertain device location when using map applications for navigation. Further examples include accessing location-based services, for instance tailored information regarding yellow-pages services or carrying out searches contextualised to the current device location. Increasingly nowadays, location services have become useful for social networking.

Satellite navigation systems such as the Global Positioning System (GPS) or GLONASS (Globalnaya navigatsionnaya sputnikovaya sistema) are useful for tracking a device's position. However, these systems may be rather unreliable in indoor environments.

SUMMARY

A first aspect of the invention provides a method comprising detecting, by a first device, a timing measurement frame from a second device, the timing measurement frame having a plurality of time measurement samples, wherein at least the first of the measurement samples has a transmit timestamp value; determining transmit timing values for the subsequent measurement samples; applying a receive timestamp value to each of the received measurement samples; and determining a relative clock drift between a clock of the first device and a clock of the second device by comparing the receive timestamp values with transmit timing values of one or more measurement samples contained in the frame.

Determining the relative clock drift may comprise comparing the receive timestamp of the first measurement sample with the transmit timestamp of the first measurement sample and comparing the receive timestamps of the one or more subsequent measurement samples with the transmit timing values of the corresponding one or more subsequent measurement samples.

The method may further comprise transmitting the relative clock drift value, the receive timestamp values and transmit timing values to a network node to calculate a distance value between the first device and the second device.

The transmit timing value of the one or more subsequent measurement samples may be derived by the receiving device from the timestamp value of the first measurement sample and a predefined offset of the measurement sample with respect to the first measurement sample.

Each of the measurement samples may have a transmit timestamp value.

The measurement samples may be contained within the frame header.

The measurement samples may be contained within the frame payload.

The format of the measurement samples may be provided to each device in the network in the form of management frames sent by devices in an ad hoc network or by access points in an infrastructure network.

The frame may be a wireless local area network frame.

A second aspect of the invention provides a method comprising transmitting, by a second device to one or more first devices, a timing measurement frame having a plurality of time measurement samples, wherein at least the first of the measurement samples has a transmit timestamp value and each of the subsequent measurement samples has a transmit timing value.

The transmit timing value may be derived by the receiving device from the timestamp value of the first measurement sample and a predefined offset of the measurement sample with respect to the first measurement sample.

Each of the measurement samples may have a transmit timestamp value.

The measurement sample may be contained within the frame header.

The measurement sample may be contained within the frame payload.

The second devices may transmit the messages in accordance with a predetermined schedule.

A third aspect of the invention provides an apparatus configured to detect, by a first device, a timing measurement frame from a second device, the timing measurement frame having a plurality of time measurement samples, wherein at least the first of the measurement samples has a transmit timestamp value; determine transmit timing values for the subsequent measurement samples; apply a receive timestamp value to each of the received measurement samples; and determine a relative clock drift between a clock of the first device and a clock of the second device by comparing the receive timestamp values with transmit timing values of one or more measurement samples contained in the frame.

Determining the relative dock drift may comprise comparing the receive timestamp of the first measurement sample with the transmit timestamp of the first measurement sample and comparing the receive timestamps of the one or more subsequent measurement samples with the transmit timing values of the corresponding one or more subsequent measurement samples.

The apparatus may be further configured to transmit the relative clock drift value, the receive timestamp values and transmit timing values to a network node to calculate a distance value between the first device and the second device.

The transmit timing value of the one or more subsequent measurement samples may be derived by the receiving device from the timestamp value of the first measurement sample and a predefined offset of the measurement sample with respect to the first measurement sample.

Each of the measurement samples may have a transmit timestamp value.

The measurement samples may be contained within the frame header.

The measurement samples may be contained within the frame payload.

The format of the measurement samples may be provided to each device in the network in the form of management frames sent by devices in an ad hoc network or by access points in an infrastructure network.

The frame may be a wireless local area network frame.

A fourth aspect of the invention provides an apparatus configured to transmit, by a second device to one or more first devices, a timing measurement frame having a plurality of time measurement samples, wherein at least the first of the measurement samples has a transmit timestamp value and each of the subsequent measurement samples has a transmit timing value.

The transmit timing value may be derived by the receiving device from the timestamp value of the first measurement sample and a predefined offset of the measurement sample with respect to the first measurement sample.

Each of the measurement samples may have a transmit timestamp value.

The measurement sample may be contained within the frame header.

The measurement sample may be contained within the frame payload.

The second devices may transmit the messages in accordance with a predetermined schedule.

A fifth aspect of the invention provides an apparatus, comprising a controller; and a memory in which is stored computer readable instructions that, when executed by the controller, cause the controller to detect a timing measurement frame from a second device, the timing measurement frame having a plurality of time measurement samples, wherein at least the first of the measurement samples has a transmit timestamp value; determine transmit timing values for the subsequent measurement samples; apply a receive timestamp value to each of the received measurement samples; and determine a relative clock drift between a clock of the first device and a clock of the second device by comparing the receive timestamp values with transmit timing values of one or more measurement samples contained in the frame.

A sixth aspect of the invention provides a non-transitory tangible computer program product in which is stored computer readable instructions that, when executed by a computer, cause the computer to detect a timing measurement frame from a second device, the timing measurement frame having a plurality of time measurement samples, wherein at least the first of the measurement samples has a transmit timestamp value; determine transmit timing values for the subsequent measurement samples; apply a receive timestamp value to each of the received measurement samples; and determine a relative clock drift between a clock of the first device and a clock of the second device by comparing the receive timestamp values with transmit timing values of one or more measurement samples contained in the frame.

A seventh aspect of the invention provides an apparatus, comprising a controller; and a memory in which is stored computer readable instructions that, when executed by the controller, cause the controller to transmit, by a second device to one or more first devices, a timing measurement frame having a plurality of time measurement samples, wherein at least the first of the measurement samples has a transmit timestamp value and each of the subsequent measurement samples has a transmit timing value.

An eighth aspect of the invention provides a non-transitory tangible computer program product in which is stored computer readable instructions that, when executed by a computer, cause the computer to transmit, by a second device to one or more first devices, a timing measurement frame having a plurality of time measurement samples, wherein at least the first of the measurement samples has a transmit timestamp value and each of the subsequent measurement samples has a transmit timing value.

A ninth aspect of the invention provides a system comprising a plurality of wireless devices and a node, wherein each of the wireless devices is configured to transmit and detect, to and from each of the other wireless devices, timing measurement frames having a plurality of time measurement samples, wherein at least the first of the measurement samples has a transmit timestamp value; determine transmit timing values for the subsequent measurement samples; apply a receive timestamp value to each of the received measurement samples contained within frames received at the wireless device; determine a relative clock drift between a clock of the transmitting device and a clock of the detecting device by comparing the receive timestamp values with transmit timing values of one or more subsequent measurement samples contained in the frame; and output the transmit timing values, receive timestamp values and the relative clock drift to the node.

The node may determine a time of flight value between each of the transmitting and detecting devices.

The node may determine a pairwise distance between each of the transmitting and detecting devices.

The node may determine a localisation map of the wireless devices.

Each of the wireless devices may transmit the timing measurement frames in accordance with a predetermined schedule.

A tenth aspect of the invention provides a method comprising providing a plurality of wireless devices and a node, transmitting and detecting, to and from each of the other wireless devices, timing measurement frames having a plurality of time measurement samples, wherein at least the first of the measurement samples has a transmit timestamp value; determining transmit timing values for the subsequent measurement samples; applying a receive timestamp value to each of the received measurement samples contained within frames received at the wireless device; determining a relative clock drift between a clock of the transmitting device and a clock of the detecting device by comparing the receive timestamp values with transmit timing values of one or more subsequent measurement samples contained in the frame; and outputting the transmit timing values, receive timestamp values and the relative clock drift to the node.

An eleventh aspect of the invention provides a computer program comprising computer readable instructions which, when executed by a computer, cause said computer to perform a method according to any preceding aspect of the invention.

BRIEF DESCRIPTION OF THE DRAWINGS

Embodiments will now be described by way of non-limiting examples with reference to the accompanying drawings, of which:

FIG. 5 illustrates a timestamp element;

DETAILED DESCRIPTION OF EMBODIMENTS OF THE INVENTION

Embodiments of the invention may allow ranging and localisation of multiple devices in a network to be carried out. This is based on time-of-flight (ToF) measurement frames being transmitted by devices within the network. The accuracy of the ToF values may be improved by determining a relative clock drift value between the two devices so that the timing error resulting from clock drift may be removed.

ToF values between devices may be obtained from a single broadcast measurement frame.

The single measurement frame transmitted by each of the devices involved in ranging may contain multiple symbols for timestamping in a ToF measurement. These symbols may be of a type known as pilots and specified in the IEEE 802.11 standard. This configuration reduces measurement overheads in the network especially in dense deployments. Each transmitting device timestamps at least one measurement symbol within the frame and encloses the one or more timestamps in the measurement frame.

Devices involved in the ranging and localisation process obtain the clock drift between the device's own clock and the clock of the ranged device. By including multiple symbols within a single frame, this determination of relative clock drift may be based on a single frame, thus reducing network overheads.

Wireless networks such as WLAN may be used indoors to provide positioning information for devices. Such systems rely on an exchange of timestamp information contained within data packets sent between several devices within the network to obtain time-of-flight (ToF) data. ToF data may then be used to calculate the distance between a sending device and a receiving device.

Time-of-flight calculations can be derived from roundtrip time, which is based on sending, by a first device, a first packet to a second device, whereby the first packet comprises a transmission time and receiving, by the first device, a second packet from the second device as a response to the first packet (the second packet comprises the reception time of the first packet and the transmission time of the second packet). To model a particular device's location using a localisation algorithm, the computation of time-of-flight information between that device and multiple other devices in the network is performed. If a device wants to know time-of-flight values for multiple devices in the same network, the amount of signalling increases quadratically with respect to the number of devices involved in the ToF calculation. For example, for 100 devices to determine time-of-flight values with respect to each other 19800 packets may need to be sent.

Figure 1:
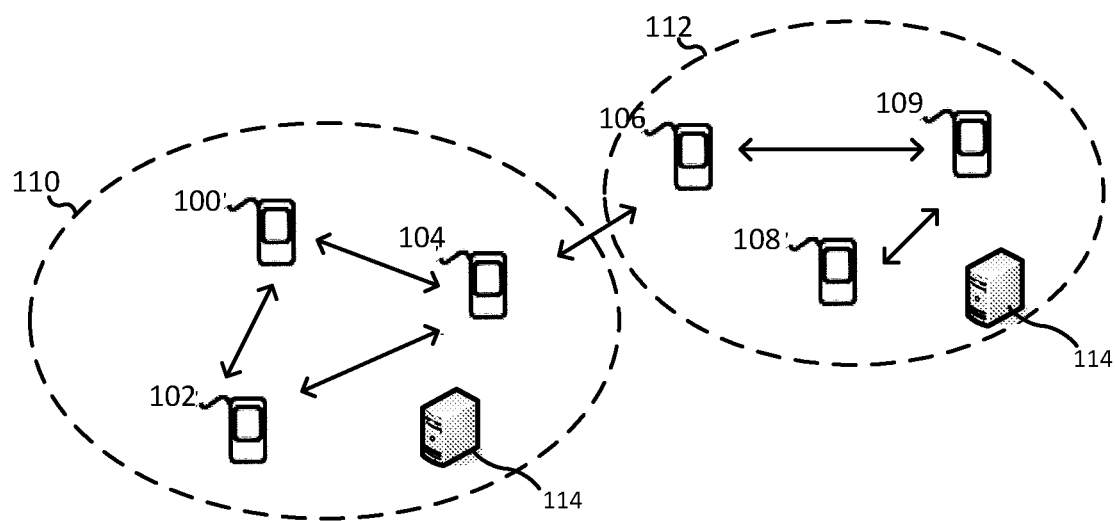
FIG. 1 shows an example network topology.

A wireless communication scenario to which embodiments of the invention are applied is illustrated in FIG. 1. FIG. 1 illustrates a plurality of wireless devices 100, 102, 104, 106, 108, 109 that form an ad hoc network. The ad hoc network may comply with neighbour awareness networking (NAN) principles as defined in the NAN standard. The wireless devices may form a single network comprising one or more clusters of the same network, or the wireless devices may form two different wireless networks 110, 112. Each of the wireless devices may employ a physical layer and a medium access control (MAC) layer that comply with wireless local area network (WLAN) specifications based on IEEE 802.11 standard but, in other embodiments, the wireless devices may support another wireless communication protocol as an alternative or in addition to the WLAN.

In the WLAN specifications, a wireless network may be called a basic service set (BSS). While embodiments of the invention are described in the context of the IEEE 802.11 standard, it should be appreciated that these or other embodiments of the invention may be applicable to wireless networks based on other specifications, e.g. WiMAX Worldwide Interoperability for Microwave Access), UMTS LTE (Longterm Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, it will be understood that the following description may be generalized to other systems as well.

The different wireless networks may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in IEEE 802.11n is that the primary and secondary channels are adjacent. The IEEE 802.11n specification also defines a mode in which a station (hereinafter STA) may, in addition to the primary channel, occupy one secondary channel which results in a maximum bandwidth of 40 MHz. IEEE 802.11ac specification extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, for the sake of simplicity the term secondary channel will be used as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides Quality of Service (QoS) enhancements to the medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration interframe spacing (AIFS) that result in higher probability of gaining the TXOP.

Furthermore, some networks may employ restricted access windows (RAW) where a reduced set of wireless devices of the wireless network may carry out channel contention. An access node or a master node may define the RAW and a group of wireless devices that are allowed to attempt the channel access within the RAW. Grouping allows partitioning of the wireless devices into groups and restricting channel access only to wireless devices belonging to a specified group at any given time period.

The time period may be enabled by allocating slot duration and a number of slots in RAW access. The grouping may help to reduce contention by restricting access to the medium only to a subset of the wireless devices. The grouping may also reduce the signalling overhead.

In a conventional IEEE 802.11 network, a wireless device initiating a TXOP may transmit a frame that triggers a network allocation vector (NAV). The frame may be a control frame such as a request to send (RTS) frame or a data frame. The frame may comprise a Duration field defining the duration of the NAV. Any other wireless device detecting the frame and extracting the Duration field suspends access to the same channel for the duration of the NAV. This mechanism may reduce simultaneous transmissions in the proximity that may be renamed as collisions. In some collisions the receiver cannot receive transmissions resulting to wasted transmission resources. The IEEE 802.11 networks may employ another collision avoidance mechanism called clear channel assessment (CCA). A wireless device trying to access the channel scans for the channel before the access. If the channel is sensed to contain radio energy that exceeds a CCA threshold, the wireless device refrains from accessing the channel. If the channel is sensed to be free and no NAV is currently valid, the wireless device may access the channel. A conventional value for the CCA threshold may be 82 decibelmilliwatts (dBm) or 62 dBm depending on a channel access scheme, for example.

The wireless devices 110, 112, 114 may employ a randomized backoff time defining a minimum time interval they refrain from frame transmissions after detecting that the channel is busy. During the channel sensing, the backoff time may be decremented while the channel is sensed to be idle or available for the channel access. When the backoff time reduces to zero and the channel is still sensed to be idle, the wireless device may carry out the frame transmission. The backoff time value may be maintained for the duration the channel is sensed to be busy and, in some systems, for a determined guard time interval (e.g. the AIFS) after the detection that the channel has become idle.

Applications for short-range wireless devices are evolving to include awareness applications providing the device with an awareness about the local network environment. An example of awareness network architecture is the Nokia AwareNet® framework, a network of wireless mobile devices self-organizing to support various applications, ranging from social networking to service discovery. Awareness information may be shared by a short-range wireless device sending an anonymous flooding message that may include a query, over an ad hoc network. A neighbouring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices may employ a physical layer and a MAC layer based on the IEEE 802.11 specifications. The awareness application may build upon a scheme in which the devices are responsible for participating in beaconing and the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among the devices within range. The determination of which schedule is used by a device may be made by the network instance timer value, and this timer value is communicated in beacons in the timing synchronization function (TSF) value parameter. The devices may operate by assuming the oldest TSF value (i.e. largest TSF value) contained in the received beacons that represent the network with the NWID in which the devices are operating. Alternatively the devices may select the schedule to follow based on some other criteria than the TSF value. Beacons may, as an example, contain information other than the TSF that is used by the devices to determine which schedule to use.

When the radio and MAC of a wireless device transmits a Beacon, the Beacon MAC Header contains the device's own current TSF value. The device may automatically transmit a reply message when it receives a Beacon from another network, the reply message being referred herein as a beacon response message. The beacon response message contains the current TSF value of the replying network. Alternatively the beacon response message may contain other information that is used to determine which schedule to use.

Wireless devices form a network where devices in proximity may communicate with each other. When two or more groups of devices forming two or more instances of the network come close to each other, the two or more instances may merge to become one network instance.

Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device.

Alternatively, a merging decision may be done based on some other information available in a Beacon or beacon response message from another wireless device. After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness application program interface (API).

Figure 2:
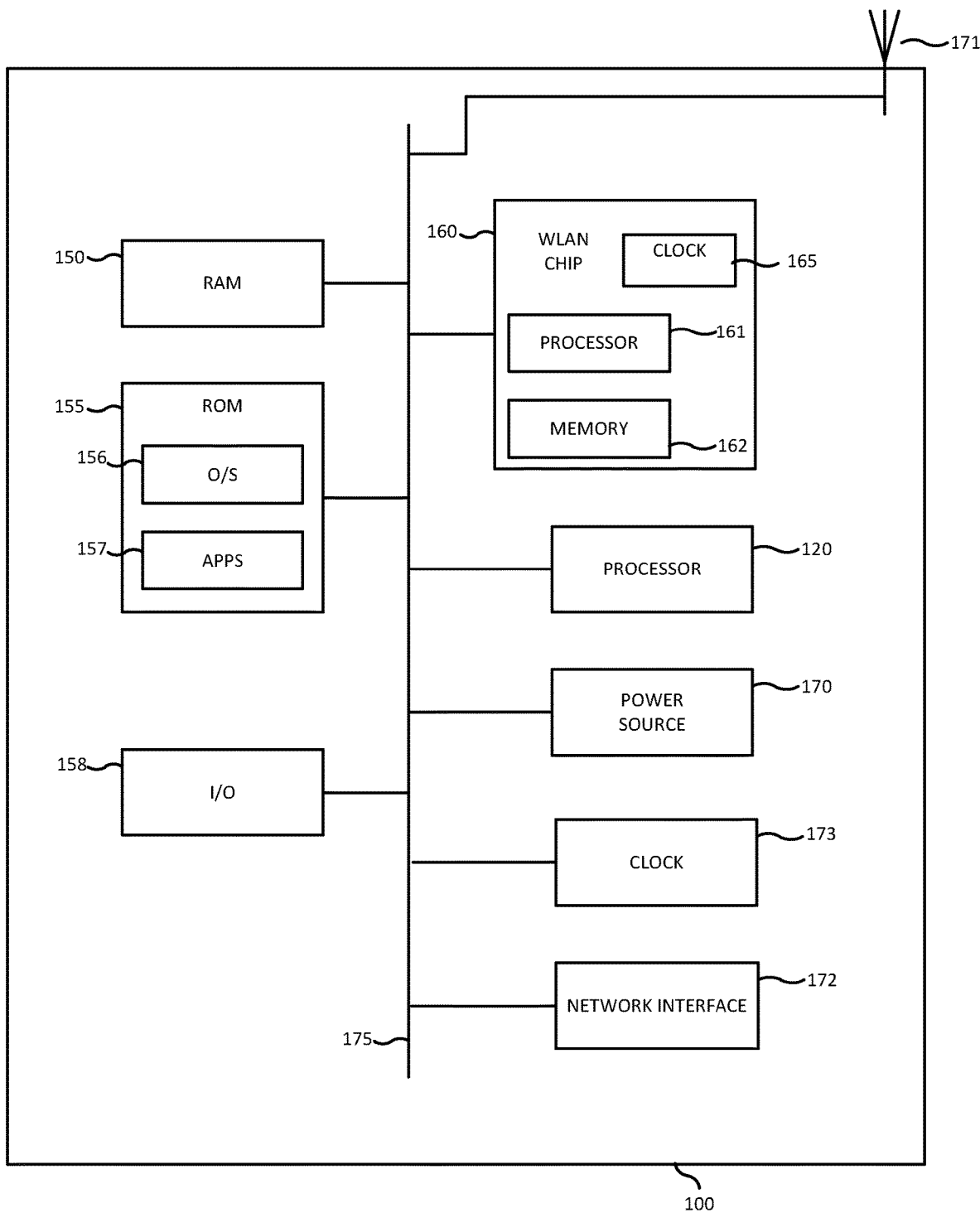
FIG. 2 is a Nock diagram providing a schematic illustration of a device.

FIG. 2 is a schematic block diagram illustrating example embodiments of the components of one of the mobile devices shown in FIG. 1. It should be borne in mind that where, later in the description, reference is made to a transmitting device or a receiving device, both may be of a type shown in FIG. 2.

The device 100 may comprise a processor or controller 120, a volatile memory such as a RAM 150 and a non-volatile memory or ROM 155. The ROM 155 has an operating system 156 and various applications 157 stored therein. The device 100 may comprise various input/output components 158 such as a touchscreen, a keyboard, a microphone and speakers. The device 100 may also comprise a power source 170 such as battery. Components may be connected via a bus 175.

The device may comprise a WLAN chip 160 coupled to an antenna 171. The WLAN chip 160 comprises a processor or controller 161 and a memory 162. The WLAN chip 160 is configured to execute the processing steps described in detail below. The WLAN chip 160 may comprise a clock 165 at the physical layer (PHY). The clock may be any suitable clock known in the art. The clock may be derived from a crystal oscillator. The clock in WLAN may operate at 40 MHz when the device is operating in a 20 MHz channel.

The device 100 may also comprise one or more additional clocks 173 of types known in the art.

The device 100 may be a desktop computer, a laptop computer, a smartphone, a tablet computer, a PDA etc. The device 100 may therefore comprise one or more network interfaces 172 to connect to networks such as a mobile telephony network, for example a 3G, 4G or 5G network, a Bluetooth network and so forth, depending on the exact form of the device 100.

The device 100 may be configured to transmit and receive OFDM frames containing measurement samples which may the take the form of OFDM symbols. In embodiments of the invention, measurement frames of a type shown in FIGS. 3 and 4 may be transmitted between devices.

Figure 3:
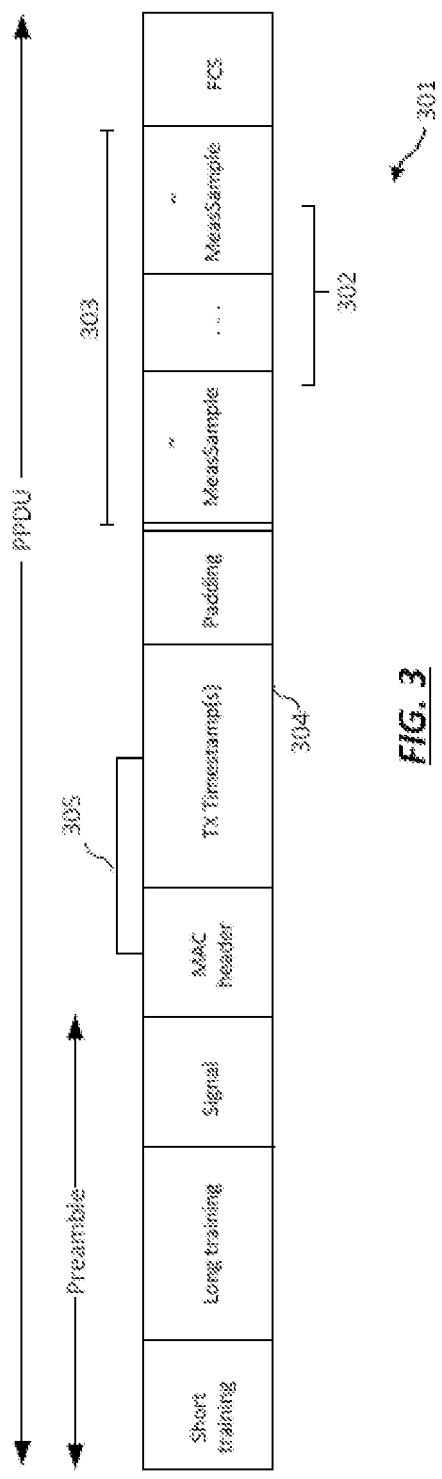
FIGS. 3 and 4 show example frame structures.

FIG. 3 shows an example of a frame 301 containing multiple measurement samples 302 according to one embodiment. The measurement samples 302 are contained within the frame payload 303. In this approach, the measurement samples are transmitted with the modulation and coding of the data payload.

In one embodiment, the transmitting device applies a transmit (TX) timestamp 304 to each of the measurement samples 302. As shown in FIG. 3, the timestamps 304 are placed within the MAC header 305 of the frame 301.

In another embodiment, each successive measurement sample included within the frame is assigned a transmit time having a known offset from the previously transmitted sample. For example the nth measurement sample may be transmitted after an interval of δt following the transmission time of the $(n-1)^{th}$ sample. In this embodiment, only a TX timestamp relating to the first measurement sample is included in the frame. The TX timestamp values of the subsequent measurement samples may then be calculated based on the known offsets between successive measurement samples. The receiving device searches measurement samples symbol-by-symbol so the measurement samples may be placed into the frame freely alongside other data symbols.

Figure 4:
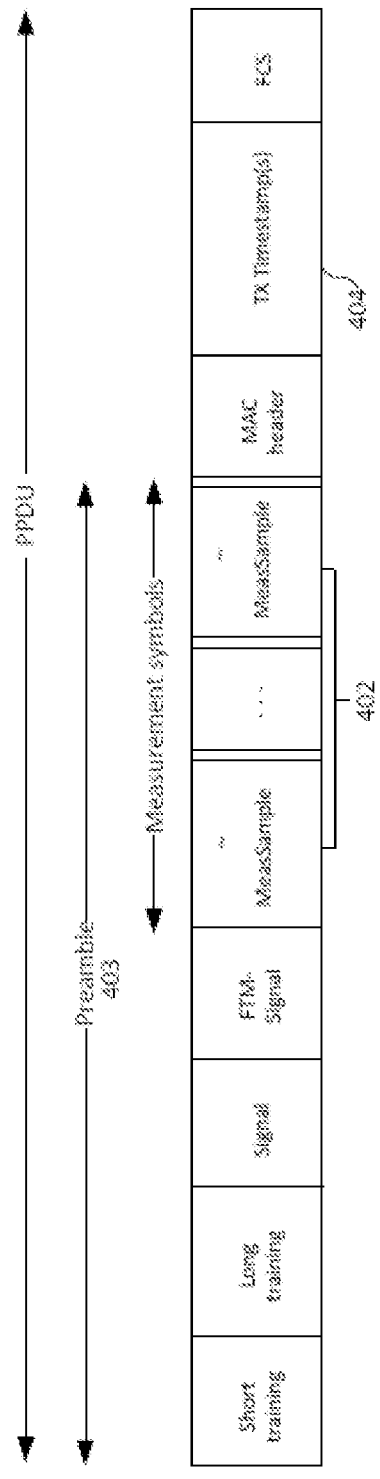

FIG. 4 shows a measurement frame 401 according to another embodiment. In this embodiment the measurement samples 402 are included as part of the frame preamble 403. In this embodiment, the measurement samples have a robust modulation and coding mechanism in use since, in OFDM frame transmission the Preamble and PLCP header of a frame are transmitted with the most robust modulation, whereas payload modulation depends on link adaptation. This frame structure is advantageous since the measurement samples are robust. Furthermore, the measurement symbols are available to the receiving device sooner as they are located towards the front of the frame. The transmitting device records the exact transmission times of the measurement samples and inserts the one or more timestamps 404 into the MAC payload.

FIG. 5 shows example content of a timestamp element 500. The timestamp element 500 shown in FIG. 5 may relate to one of the timestamps 304 or 404 shown in FIGS. 4 and 5 respectively. The timestamp element 500 comprises an element ID 501 which is a unique number that specifies the TX Timestamps element. The length element 502 specifies the length of the TX Timestamps element in unit of octets.

The Number of Measurement Symbols element 503 indicates the number of the symbols used to determine the relative clock drift between the receiving dock and the transmitting clock.

The timestamp mode element 504 indicates the mode in which the Time Stamp Measurement Samples are grouped. In some embodiments, the default value is 0, indicating that every symbol in the frame relates to a measurement sample. A value of 1 may indicate that every second symbol contains a measurement sample.

The last bit of the Timestamp Mode element 504 may also indicate whether there are timestamps provided for all transmitted Measurement Samples or whether a timestamp is provided only for the first sample from which time values for subsequent samples may be determined.

Embodiments in which the frame contains a single timestamp for the first measurement sample may be advantageous since a frame having a single timestamp uses fewer bits of data than are used for frames having multiple timestamps.

Embodiments that utilise frames having multiple timestamps may be used if the transmitting device comprises a second clock that is more accurate than the one used for timing the transmissions. In this case, more accurate timestamps may be obtained.

The Time Stamp of Measurement Sample element 505 may indicate in units of nanoseconds or a fraction of nanoseconds the time stamp of the device individual time of the transmission of the first measurement symbol and if the following high accuracy timestamps are present, they present the timestamps of the following Measurement Samples.

The padding may range between zero and X octets and its size may be selected to enable Measurement Sample transmission in its own symbol. If the measurement samples are part of the preamble, then this padding may not be needed.

The Measurement Sample may be included within a symbol with a predefined, known value for each used modulation and coding mechanism. If the measurement samples are located in the preamble, then the Measurement samples may be transmitted at the most robust transmission rate in accordance with the IEEE 802.11 standard. This may assist the receiving device to synchronize its clock to the received symbols.

The timestamp of the first measurement sample in the measurement frame may be used as a synchronization reference point between the transmitting and receiving device clocks. The precise synchronization reference point may be the start of the preamble, end of the preamble, the first symbol, a specific symbol or the last symbol of the transmitted frame. A reference point may be the start of an OFDM symbol (after the guard interval, GI). Using a reference point at the start of the OFDM symbol is advantageous as the remaining content of the frame may be used to calculate the relative clock drift.

The receiving device may determine the relative clock drift between the receiving device and the transmitting device by receiving multiple symbols, each symbol having its own respective time value. The clock drift difference may be detected by comparing the measured time difference between the RX timestamps with the nominal time difference between the TX timestamps.

Figure 6:
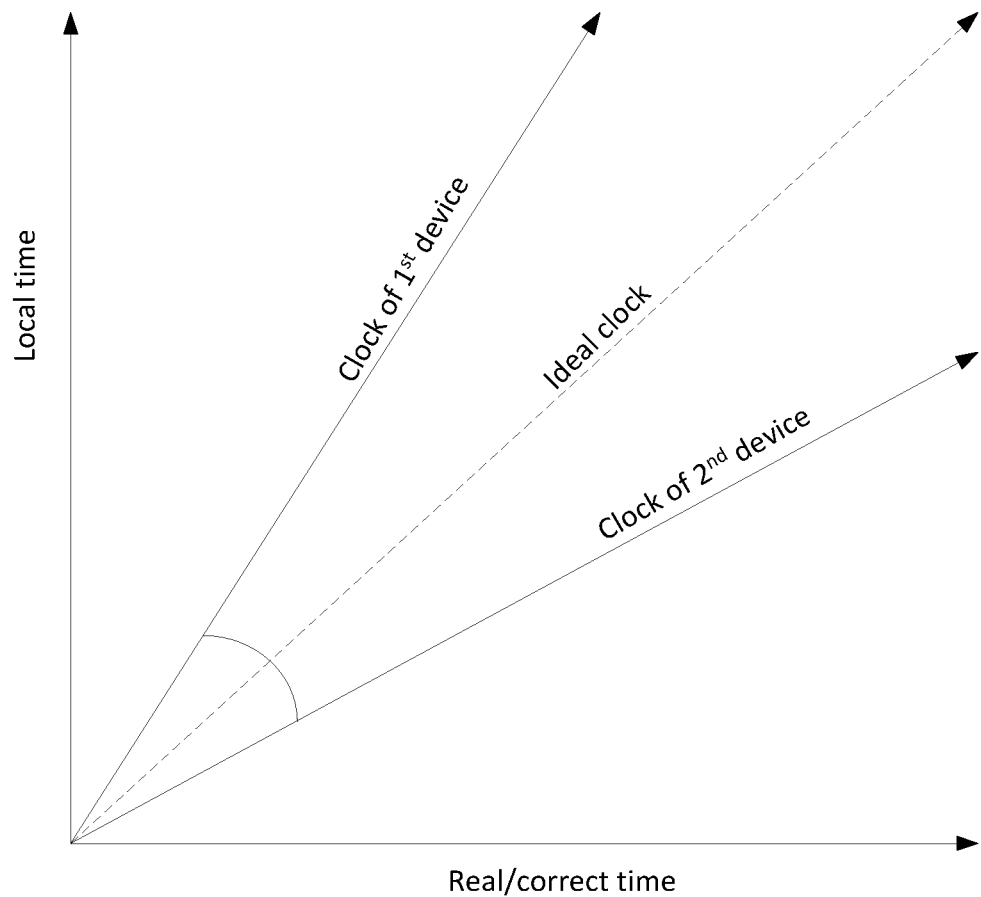
FIG. 6 is a graph illustrating the relationship between a real time and a device local time.

FIG. 6 is a graph illustrating the relationship between device clock parameters of two clocks where relative clock drift between the two clocks is present. The horizontal axis charts real or correct time, i.e. the standardised time as maintained by official time sources. The vertical axis charts local time, i.e. the time measured at the clock of a particular device.

The dashed line shows the relationship between real time and local time for an ideal clock. This line has a gradient of one meaning that the local time of the ideal clock is equal to the correct time.

The solid lines show the behaviour of clocks of the first and second devices. Both of these clocks are non-ideal. As (correct) time progresses as shown on the horizontal axis, the local time of each clock drifts further away from the local time value of the ideal clock. Therefore, both of these clocks displays clock drift. The gradient of the line for the first clock corresponds to the clock drift of the first device (D1). The gradient of the line for the second clock corresponds to the clock drift of the second device (D2).

The relative clock drift between the first and second clocks may be expressed as the ratio of the two clock drifts. The relative clock drift may be the clock drift of the first device divided by the clock drift of the second device.

Relative clock drift=D1/D2

The time measurement may be done with a transmission of a single frame. In embodiments of the invention, the receiver of the ToF Measurement frame may be able to calculate the ToF from the transmitting device. In other embodiments, a node in the network may calculate the ToF.

The form of the measurement symbols contained within each measurement sample may be known to each device in the network. Since the data in the symbol is known by both the transmitting device and the receiving device, the receiving device may be aware of what pattern to search for in the received frame. The receiving device may therefore identify the measurement symbol within the sample and extract the timestamp corresponding to that symbol. The receiving device may extract the timestamp using a cross-correlation function.

The form of the measurement samples may be provided to each device in the network in the form of management frames sent by devices in an ad hoc network or by the access points in an infrastructure network. Alternatively, hardcoded measurement symbols may be used. This means that the measurement symbol (standardized or proprietary) may be coded into the chip so that a received measurement symbol may be easily recognised by a receiving device.

Figure 7:
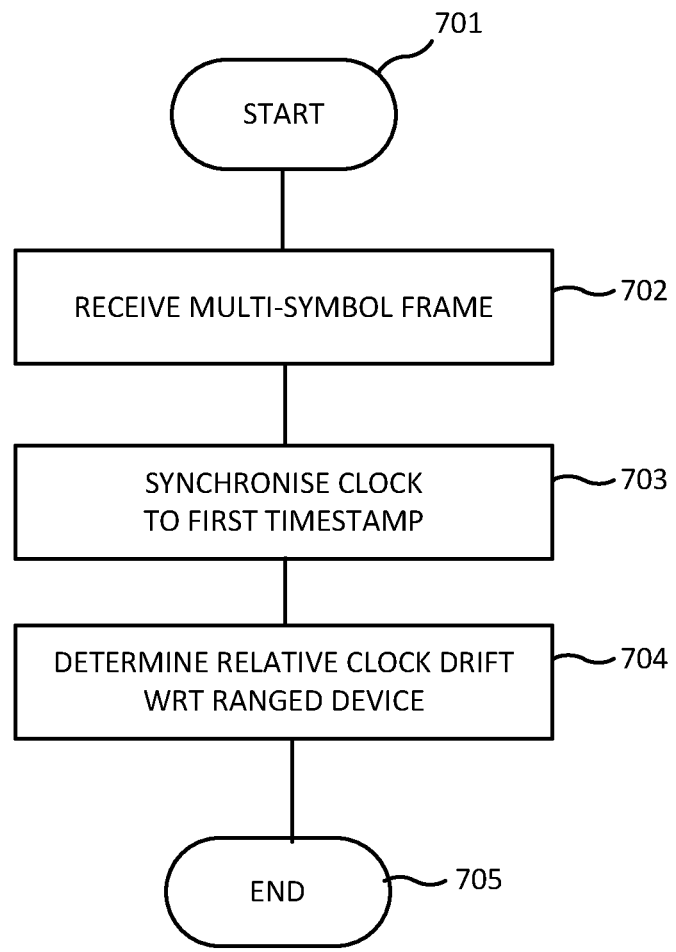
FIG. 7 is a flow chart illustrating embodiments of the invention.

FIG. 7 is an example flowchart showing the steps taken at the WLAN chip 160 when a frame of the type described above is received.

The process starts at step 701.

At step 702, a receiving device detects a frame of the type described above. The receiving device assigns a receiving (RX) timestamp to record the reception times of the Measurement Samples contained within the frame. The RX timestamp may be assigned to each sample by running a crosscorrelation function of the received signal with the known measurement symbol and recording the time instants when there is a peak in cross correlation result. The time instants at which the timestamp is recorded may be determined using the device TSF. Each sample therefore has an RX timestamp applied by the receiving device.

At step 703, the receiving device synchronizes its clock to the clock of the transmitting device. This is done by synchronizing the RX timestamp of the first measurement sample with the TX timestamp of the first measurement sample. The first measurement sample may be considered to form a synchronization sample.

In embodiments using ad hoc or NAN type of synchronization and which use the TSF as the timestamp value for ranging, a separate clock may be used to determine the measurement interval to avoid jumps.

At step 704, the receiving device compares the RX timestamp of each measurement sample subsequent to the first measurement sample with the TX time value of each of the n measurement samples. In embodiments where each sample has a TX timestamp, the comparison is between each RX timestamp and each respective TX timestamp. In embodiments where only the first measurement sample has a TX timestamp, the comparison is between each RX timestamp and the TX time value determined as an offset from the first TX timestamp.

In an ideal environment where there is no relative clock drift between the receiving and transmitting devices, the interval between the TX timestamp of the synchronization sample and the TX timestamp of the next sample should be equal to the interval between the RX timestamp of the synchronization sample and the RX timestamp of the next sample.

However, if the intervals are not equal then clock drift may be present. The difference between the TX timestamps of the measurement samples and the synchronized RX timestamps of the received measurement samples provides a value for the clock drift between the clocks of the receiving device and the transmitting device. This difference is referred to herein as the relative clock drift. Multiple samples enable the calculation of the relative clock drift and multiple timestamps improve the preciseness of the clock drift calculation.

The RX timestamps, TX timestamps or determined time values and the relative clock drift value may be provided to a node to calculate ToF information and device localisation.

The method ends at step 705.

A ToF value for the measurement frame between the transmitting device and the receiving device may be obtained by solving equations for times of flight between devices. Such equations are known in the art and use relative clock drift values, RX timestamp values and TX timestamp values as parameters.

The devices may distribute all RX timestamps to the other devices. Once all of the TX and RX timestamps and relative clock drifts are known by all the devices that took part of the measurement, a node may compute all locations at once by solving one equation using a localisation algorithm.

The node may be a server 114 (shown in FIG. 1) comprising one or more processors, memories and may have stored thereon suitable code to allow the location information to be determined. Alternatively, the node may be one of the wireless devices.

In a network containing several devices, each device may transmit measurement frames to the other devices in the network to allow the ToF information to be obtained. Various localisation algorithms may be used to form a map showing the locations of the devices within the network. The information required to determine the ToF may be provided to the server 114 by any suitable wireless connection. Since the calculations that determine the localisation may require a considerable amount of processing capacity, outputting the information to a server 114 may be advantageous.

A schedule may be planned which is distributed to each node within the network in advance. The schedule indicates at what time the node is to transmit a measurement frame of the type described above. The schedule may be contained within network beacon frames.

A first device 100 may start the procedure by transmitting a measurement frame. Each device in the network may count the received frames to find its own turn in the schedule and then broadcasts a frame.

Figure 8:
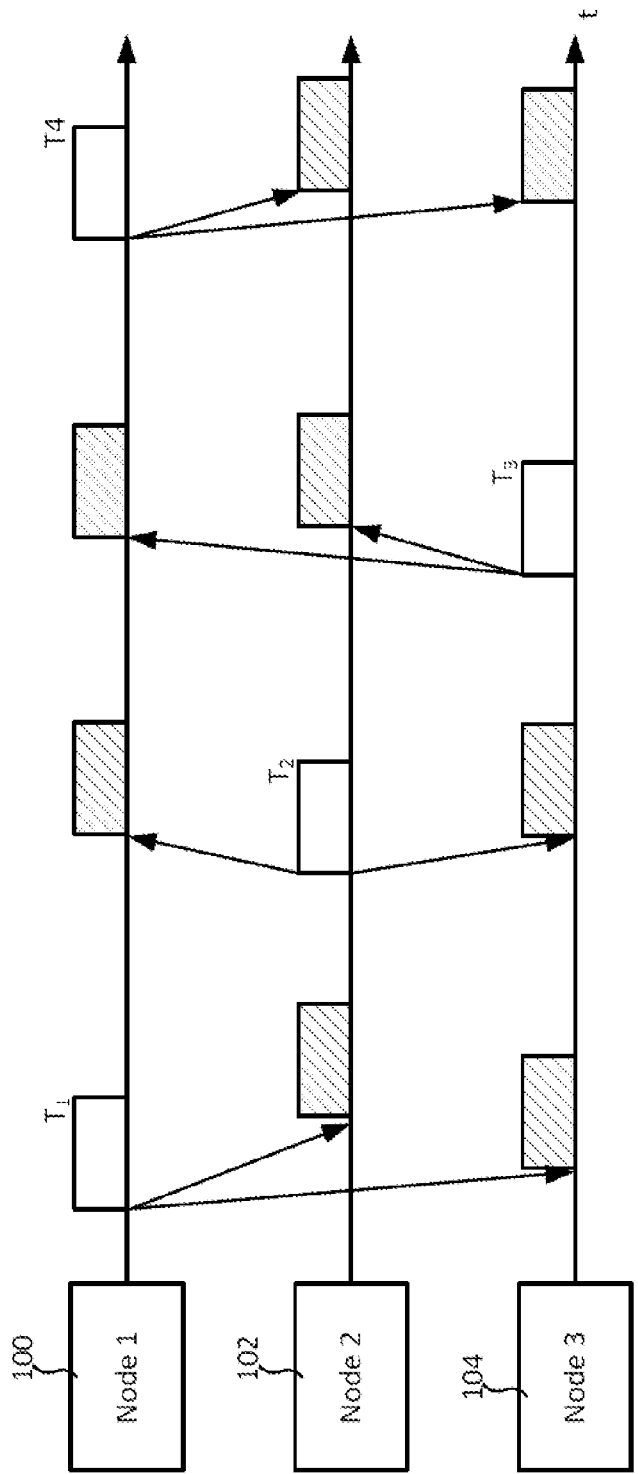
FIG. 8 shows an exchange of messages between devices according to embodiments.

FIG. 8 shows three devices 100, 102 and 104, which are nodes in a WLAN network. In TOF measurement, each device broadcasts a TOF measurement frame T periodically to other devices in the network. Device 100 broadcasts a first message T1. Device 102 broadcasts a message T2 a predetermined interval after T1. Device 104 broadcasts a message T3 a predetermined interval after T2. The first device 100 broadcasts a second message T4 a predetermined interval after T3 and so forth. Thus, each device in the network may broadcast messages T periodically.

Each device applies timestamps to one or more of the outgoing samples within the frame as described above. Each device receives all the messages and applies a receive timestamp to the samples contained therein.

Each device may repeat transmission of the measurement frames after a specified time interval.

Each device may then broadcast its recorded RX timestamps, TX timestamps or determined time values and relative clock drift values in a message that is transmitted to the server 114.

The server may 114 then determine ToF information. The server may then determine the positions of each of the devices in the network.

For example, a ranging mechanism may be used corresponding to that described in Synchronization and Ranging by Scheduled Broadcasting by Hassan Naseri et al which is incorporated herein by reference.

Those skilled in the art will recognise that embodiments described herein have the following advantages:

Efficient use of bandwidth may be achieved since only a single measurement packet needs to be transmitted between devices in order to determine the relative clock drift and obtain a ranging estimate between the transmitting and receiving devices.

The single packet transmission from one transmitting may be used by multiple receiving devices to determine ranging estimates between the transmitting device and each of the receiving devices.

A receiving device can estimate linear clock parameters of the transmitting device using a single packet. A relative clock drift value may be determined to improve the location estimate in collaborative positioning.

The foregoing embodiments are exemplary. Although the specification may refer to "an", "one", or "some" embodiment(s) in several locations, this does not necessarily mean that each such reference is to the same embodiment(s), or that the feature only applies to a single embodiment.

Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the foregoing, it will be understood that the described processors may be any suitable type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The or each processing circuitry or processor may be termed processing means.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc, or a "processor" or "processing circuit" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realised that the foregoing embodiments are not to be construed as limiting and that other variations and modifications will be evident to those skilled in the art. Moreover, the disclosure of the present application should be understood to include any novel features or any novel combination of features either explicitly or implicitly disclosed herein or in any generalisation thereof and during prosecution of the present application or of any application derived therefrom, new claims may be formulated to cover any such features and/or combination of such features.

The invention claimed is:

1. A method comprising:
    detecting, by a first device, a timing measurement frame from a second device, the timing measurement frame having a plurality of time measurement samples, wherein at least a first time measurement sample of the plurality of time measurement samples has a transmit timestamp value;
    determining transmit timing values for subsequent time measurement samples of the plurality of time measurement samples based on an offset from the transmit timestamp value of the first time measurement sample;
    applying a receive timestamp value to each of the subsequent time measurement samples received; and
    determining a relative clock drift between a clock of the first device and a clock of the second device by comparing the receive timestamp values with transmit timing values of the subsequent time measurement samples contained in the timing measurement frame.

2. The method claim 1, wherein determining the relative clock drift comprises comparing the receive timestamp value of the first measurement sample with the transmit timestamp value of the first measurement sample and comparing the receive timestamp values of the subsequent time measurement samples with the transmit timing values of the subsequent time measurement samples.

3. The method of claim 1, further comprising transmitting the relative clock drift value, the receive timestamp values and transmit timing values to a network node to calculate a distance value between the first device and the second device.

4. The method of claim 1, wherein the transmit timing value of the one or more subsequent measurement samples is derived by the first device from the timestamp value of the first measurement sample and a predefined offset of the measurement sample with respect to the first measurement sample.

5. The method of claim 1, wherein each of the measurement samples has a transmit timestamp value.

6. The method of claim 1, wherein the timing measurement frame is a wireless local area network frame.

7. A method comprising:
   transmitting, by a second device to one or more first devices, a timing measurement frame having a plurality of time measurement samples, wherein at least a first time measurement sample of the plurality of time measurement samples has a transmit timestamp value;
   determining for subsequent time measurement samples of the plurality of time measurement samples a transmit timing value based on an offset from the transmit timestamp value of the first time measurement sample;
   applying a receive timestamp value to each of the subsequent time measurement samples; and
   determining a relative clock drift between a clock of the first device and a clock of the second device by comparing the receive timestamp values with transmit timing values of the subsequent time measurement samples contained in the timing measurement frame.

8. The method of claim 7, wherein the transmit timing value is derived by the first device from the timestamp value of the first measurement sample and a predefined offset of the measurement sample with respect to the first measurement sample.

9. The method of claim 7, wherein each of the measurement samples has a transmit timestamp value.

10. An apparatus, comprising:
    at least one processor; and
    at least one memory including computer program code, the at least one memory and the computer program code configured to, with the at least one processor, cause the apparatus to perform at least the following:
    detect, by a first device, a timing measurement frame from a second device, the timing measurement frame having a plurality of time measurement samples, wherein at least a first time measurement sample of the plurality of time measurement samples has a transmit timestamp value;
    determine transmit timing values for subsequent measurement samples of the plurality of time measurement samples based on an offset from the transmit timestamp value of the first time measurement sample;
    apply a receive timestamp value to each of the subsequent time measurement samples received; and
    determine a relative clock drift between a clock of the first device and a clock of the second device by comparing the receive timestamp values with transmit timing values of the subsequent time measurement samples contained in the timing measurement frame.

11. The apparatus of claim 10, wherein determining the relative clock drift comprises comparing the receive timestamp of the first measurement sample with the transmit timestamp of the first measurement sample and comparing the receive timestamps of the one or more subsequent measurement samples with the transmit timing values of the corresponding one or more subsequent measurement samples.

12. The apparatus of claim 10, further comprising transmitting the relative clock drift value, the receive timestamp values and transmit timing values to a network node to calculate a distance value between the first device and the second device.

13. The apparatus of claim 10, wherein the transmit timing value of the one or more subsequent measurement samples is derived by the first device from the timestamp value of the first measurement sample and a predefined offset of the measurement sample with respect to the first measurement sample.

14. The apparatus of claim 10, wherein the timing measurement frame is a wireless local area network frame.

15. An apparatus, comprising:
    at least one processor; and
    at least one memory including computer program code, the at least one memory and the computer program code configured to, with the at least one processor, cause the apparatus to perform at least the following:
    transmit, by a second device to one or more first devices, a timing measurement frame having a plurality of time measurement samples, wherein at least a first time measurement sample of the plurality of time measurement samples has a transmit timestamp value;
    determine for subsequent time measurement samples of the plurality of time measurement samples a transmit timing value based on an offset from the transmit timestamp value of the first time measurement sample;
    apply a receive timestamp value to each of the subsequent time measurement samples; and
    determine a relative clock drift between a clock of the first device and a clock of the second device by comparing the receive timestamp values with transmit timing value of the subsequent time measurement samples contained in the timing measurement frame.

16. The apparatus of claim 15, wherein the transmit timing value is derived by the first device from the timestamp value of the first measurement sample and a predefined offset of the measurement sample with respect to the first measurement sample.

17. A non-transitory tangible computer program product in which is stored computer readable instructions that, when executed by a computer, cause the computer to:
    detect a timing measurement frame from a second device, the timing measurement frame having a plurality of time measurement samples, wherein at least a first time measurement sample of the plurality of time measurement samples has a transmit timestamp value;
    determine transmit timing values for subsequent time measurement samples of the plurality of time measurement samples based on an offset from the transmit timestamp value of the first time measurement sample;
    apply a receive timestamp value to each of the subsequent time measurement samples received; and
    determine a relative clock drift between a clock of the first device and a clock of the second device by comparing the receive timestamp values with transmit timing values of the subsequent time measurement samples contained in the measurement sample frame.

18. A system comprising a plurality of wireless devices and a node, wherein each of the wireless devices is configured to:
    transmit and detect, to and from each of the other wireless devices, timing measurement frames each having a plurality of time measurement samples, wherein at least a first time measurement sample of the plurality of time measurement samples contained in each timing measurement frame has a transmit timestamp value;

determine transmit timing values for subsequent time measurement samples of the plurality of time measurement samples contained in each timing measurement frame;

apply a receive timestamp value to each of the subsequent time measurement samples contained within each of the plurality of time measurement frames received at the wireless device;

determine a relative clock drift between a clock of the transmitting wireless device and a clock of the detecting wireless device by comparing the receive timestamp values with transmit timing values of the subsequent time measurement samples contained in each of the plurality of time measurement frames; and output the transmit timing values, receive timestamp values and the relative clock drift to the node.

19. The system of claim 18, wherein the node determines a time of flight value between each of the transmitting and detecting devices.

20. The system of claim 18, wherein the node determines a pairwise distance between each of the transmitting and detecting devices.

* * * * *